April 11, 1950 C. B. VICKERS 2,503,892
MANUALLY CONTROLLED POWER HYDRAULIC BRAKE
Filed March 3, 1948
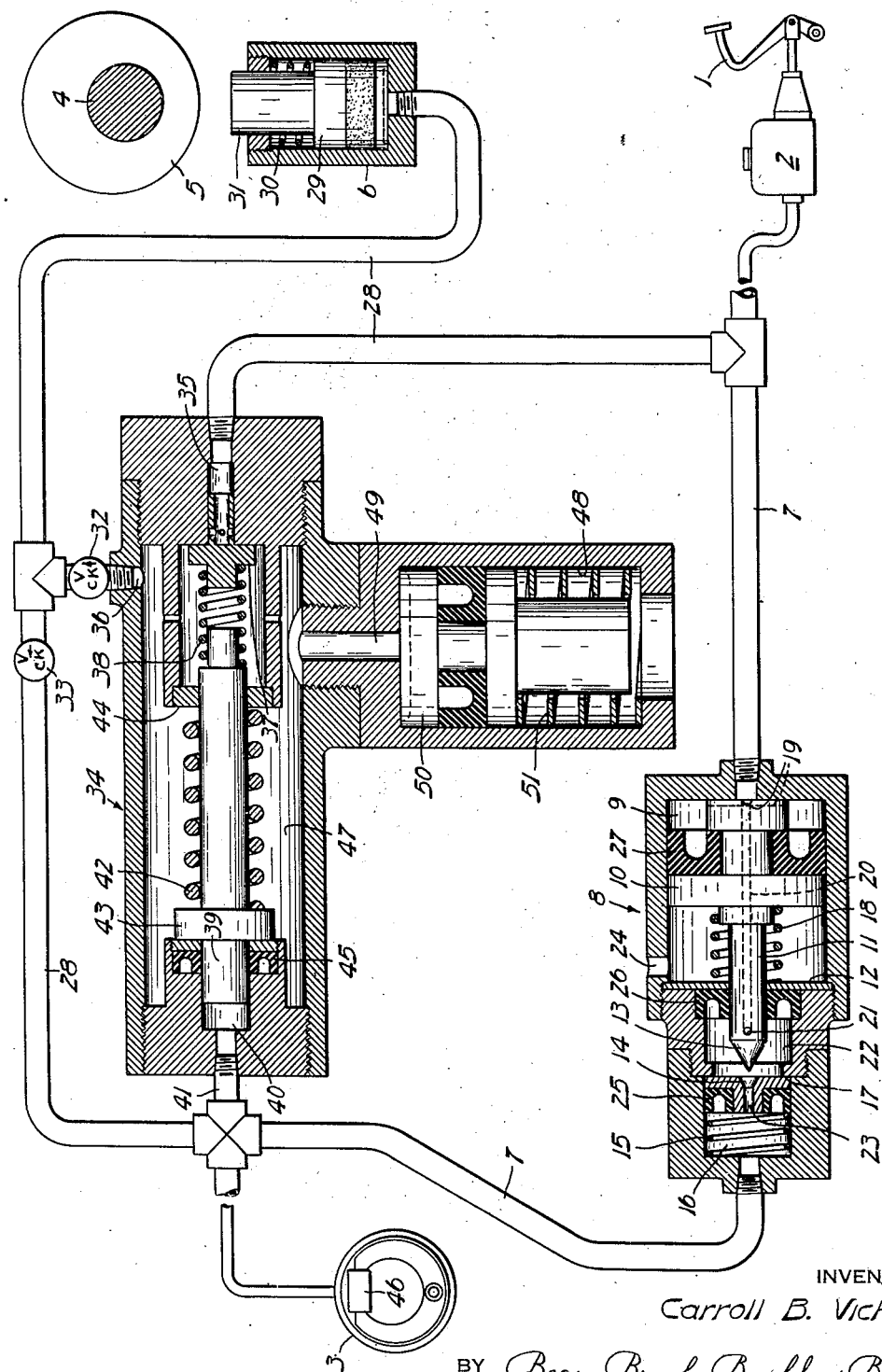
INVENTOR.
Carroll B. Vickers
BY Bean, Brooks, Buckley & Bean
ATTORNEYS.

Patented Apr. 11, 1950

2,503,892

UNITED STATES PATENT OFFICE 2,503,892

MANUALLY CONTROLLED POWER HYDRAULIC BRAKE

Carroll B. Vickers, Snyder, N. Y.

Application March 3, 1948, Serial No. 12,835

20 Claims. (Cl. 60—54.5)

This invention relates to hydraulic brake systems for motor vehicles and is especially applicable to large motor buses and semi-trailer vehicles in which considerable braking effort is required to safely manipulate them along the highways.

More particularly it relates to a hydraulic brake system in which a power unit is employed for applying the heavy brake pressure required.

The primary object of the invention is to provide a hydraulic brake system which is reliable and efficient and which may be readily controlled by the motorist with little effort and a minimum of annoyance incidental to the power driven pump employed in the system.

The invention further has for its object to provide a brake system of this character in which the application and release of the braking pressure is readily and safely controlled by the motorist.

Again, the invention will be found in a system which embodies certain safety factors serving to provide greater safety in operation and less likelihood of impairment from excessive pressures.

The foregoing and other objects will manifest themselves as the following description progresses, reference being had to the accompanying drawing which illustrates diagrammatically a braking system constructed in accordance with the present invention.

Referring more particularly to the drawing, the numeral 1 designates the pedal, 2 the master cylinder, 3 one of the vehicle wheel brakes, 4 the vehicle drive shaft, or some other rotating shaft or power take-off, 5 a cam fixed thereon, and 6 the power pump which is driven by the cam. Where the shaft is a slowly rotating one, it may be desirable to have two or more pump actuating lobes on the cam. A conduit 7 establishes communication between the master cylinder and the bus or vehicle brakes as well as the trailer brakes.

Interposed in the brake line 7 is a manual pressure control unit 8 which determines the initial braking pressure that can be applied directly by the pedal before the power pump is called into function. This unit, in its illustrated embodiment, comprises a chamber 9 having a piston 10 of relatively large area and a stem or rod 11 which guidingly slides through a fixed disk 12 and is pointed at 13 to seat as a valve in a seat 14. The seat is backed by a spring 15 and guided within a counterbore 16 in communication with the brakes. A shoulder 17 limits the outward movement of the seat. A spring 18 normally lifts the valve 13 from its seat and holds the piston against the end wall of the chamber 9 through which opens the brake line from the master cylinder. Cross passages 19 enable the foot pressure being transmitted readily to the active face of the piston while an axial bore 20 extends from the cross passages and through the stem 11 to a transverse bore 21 adjacent the valve. This communication provides for the transmission of the foot pressure out through the valve chamber 22 and on to the brakes. It also permits the return of the hydraulic fluid from the brakes to the master cylinder when the pedal is relieved of the foot pressure.

When the pedal is depressed the fluid flows from the master cylinder into chamber 9, thence through the axial bore 20 and into the valve chamber and finally out through an axial port 23, in the floating valve seat 14, and to the brakes. Should the pedal be quickly depressed so that it moves the valve 13 to its seat before the brakes are initially set, then the seat 14 will yield away from the valve under the pressure build-up in the valve chamber 22, the valve being limited in its seating movement by the spring 18 compressing upon the disk 12. A vent 24 opens the chamber under the piston 10 to the atmosphere. The three packings 25, 26 and 27 seal the sliding contacts against leakage of fluid.

After the preliminary setting of the brakes has been effected by the pressure control unit 8, for example, upon a manual pressure of one hundred pounds more or less, further braking pressure is power-applied but still under the control of the foot upon the pedal. To this end a conduit 28 branches off from the conduit 7, at a point ahead of the pressure control unit 8, and connects with the cam driven pump 6 and from thence to the brake line downstream from the manual pressure control unit. The pump has a piston 29 urged inwardly by a spring 30 but is adapted to respond to a predetermined foot pressure beneath the piston in order to project the piston stem or rod 31 into the path of the cam. As the cam is revolving constantly the pump will thereupon intake fluid through its inlet valve 32 and expel it through its outlet valve 33 and into the brake line 7. However, this operation does not occur until after the manual pressure control unit 8 has blocked the further admission of fluid to the brakes solely in response to the pedal 1.

A pump pressure control unit 34 is inserted in the branch conduit 28 between the master cylinder and the cam driven pump. This unit has an inlet 35, to which the master cylinder is connected, and an outlet 36 which leads off to the cam actuated pump. The inlet is normally closed by a valve 37 under the urge of a coiled spring 38 which latter is regulatable in accordance with the pressure on the braking fluid. For this purpose a pressure responsive member 39 operates within a chamber 40 which in turn communicates through a passage 41 to the brake line 7, 28 at a point beyond the manual pressure control 8 and the check valve 33. The spring 38 finds support upon the pressure responsive member so that when the latter moves under the urge of the hydraulic medium the spring tension will be increased and necessitate greater foot pressure to unseat the valve 37. A heavier spring 42, calibrated to a given strength, will urge the member 39 back into its chamber 40. This heavier spring seats at one end upon an annular shoulder 43 on the pressure responsive member and at its opposite end upon a support 44 through which the responsive member slides. The shoulder 43 engages the adjacent end of the chamber 40 to determine the innermost position for the responsive member, the latter being sealed against fluid leakage by packing 45.

The operation of the mechanism is such that upon depression of the pedal the hydraulic fluid will initially enter and pass through the manual pressure control 8 and on into the brake motors 46 for taking up all slack in the brakes and even to the extent of lightly applying the brakes 3 to the degree determined by the spring 18. Beyond this initially and directly applied pressure from the pedal, the valve 13 will move onto its yieldable seat 14 to preclude the passage of additional foot expressed fluid therethrough. Until this time the branch passage 28 to the pump pressure control 34 has been closed by the spring pressed valve 37 whose spring is calibrated now to open, or substantially so. The foot pressure from now on will be transmitted out through the large chamber 47 of the pump pressure control and on to the cam driven pump 6 where the pressure will lift the pump piston 29 against the action of its spring 30 and into the path of the rotating cam 5 for reciprocation thereby. Thus, the power-applied pressure will be transmitted through the outlet valve 33 and into the brake line where it will react upon the pressure responsive member 39 and move it against its spring 42 to increase the tension of spring 38 and, consequently, to raise the needed foot pressure requirement. The motorist can readily feel through his foot the changes in the requirements. As this pressure requirement approaches a critical stage the pressure responsive member will positively contact the valve 37 and hold it to its seat against the addition of more fluid into the brake line by way of the cam driven pump. This arrangement constitutes a safety factor in that it precludes such excessive pressure which would rupture the brake line or otherwise impair the brake system. As a further safety factor the heavier spring 42 for the pressure responsive member will serve to dampen the pump pulsations in the brake line and enlarge the line capacity to avoid excessive strains rupturing the brake line. Again, the higher pump generated pressure will react to hold the yieldable valve 14 firmly against the shoulder 17.

In a brake system employing a power driven pump the pulsations of the latter have heretofore been transmitted to the pedal 1 and constitute a source of annoyance to the motorist. As the pump 6 operates, its inlet valve 32 will alternately open and close with the closing action occurring at the start of the compression stroke. During its closing movement a small reverse flow of fluid takes place. This fact, coupled with the further fact that the motorist is continuing to depress the pedal to displace more fluid into the chamber 47, results in the objectionable "bump" or pulsation upon the foot. To relieve this nuisance, there is provided a pulsation absorbing means in the form of a chamber 48 which has constant communication with the chamber 47 through a passage 49 and contains a plunger or movable wall 50 backed by a spring 51. This pulsation absorbing chamber provides ample space for such excess fluid displacement and since the chamber is elastic or expansible in capacity by reason of the yieldable wall 50 the chamber will intermittently expand and contract in accordance with the pulsations. The area of the yieldable wall is sufficiently large to respond quickly to the pulsations. The foot will therefore be relieved of a noticeable throbbing or beating when the brakes are applied. Additional pumps may be utilized, if desired, and so arranged about the actuating cam means as to be progressively operated.

When the pedal is relieved of a depressing foot pressure the brake pressure will be released by the escape of fluid through the port 23 and the valve ducts 21 and 20 back into the master cylinder. This escape of fluid is readily controlled from the pedal. Should the brakes be partially released, the retained hydraulic pressure in the line will reseat the valve 13. Upon full release of the braking pressure the normal static line pressure of a few pounds will be restored throughout the system.

Should the cam driven piston 29 for any reason fail to respond to the fluid pressure, and therefore the piston rod 31 remain without the path of the cam 5, the brakes may nevertheless be actuated in response to increased foot pressure since the higher pressure will be transmitted through the branch passage 28, unseating the valve 37 and flowing through the pump valves 32, 33 into the brake line.

The improved hydraulic brake of the present invention is efficient and practical in that it embodies a power unit which may be called into action automatically. The power driven pump may operate without pulsation-annoyance to the motorist. The power driven pump may operate safely and without injury to the system. And while the foregoing description has been given in detail, it is without thought of limitation since the inventive principles involved are capable of assuming other physical embodiments without departing from the spirit of the invention and the scope of the appended claims.

What is claimed is:

1. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, and pulsation absorbing means arranged to preclude the transmission of the pump pulsation to the device.

2. A hydraulic brake system for motor vehicles, comprising a brake line establishing communication between a manually actuated pressure producing device and a brake motor, a control unit interposed in the line and responding to a predetermined pressure therein to interrupt the communication, said unit having a pressure actuated valve seating in the direction of flow from the device, a yieldable seat for the valve yieldable away from the latter and in such direction of flow, a pulsation producing pump having an inlet connected by a branch passage to the line between the device and the unit and an outlet connected by a second branch passage to the line between the unit and the motor, and pulsation absorbing means arranged to preclude the transmission of the pump pulsation to the device.

3. A hydraulic brake system for motor vehicles, comprising a brake line establishing communication between a manually actuated pressure producing device and a brake motor, a control unit interposed in the line and responding to a predetermined pressure therein to interrupt the communication, said unit having a chamber with a pressure responsive member therein having a stem providing a valve seating in the direction of flow from the device, the stem having a duct therein opening into the chamber at opposite sides of the member, and power means bypassing the control unit and acting to increase the braking pressure to the motor, said power means including a normally closed valve opening substantially to such predetermined pressure for so bypassing the unit.

4. A hydraulic brake system for motor vehicles, comprising a brake line establishing communication between a manually actuated pressure producing device and a brake motor, a control unit interposed in the line and responding to a predetermined pressure therein to interrupt the communication, said unit having a pressure actuated valve seating in the direction of flow from the device, a yieldable seat for the valve yieldable away from the latter and in such direction of flow, and power means including a normally closed valve responsive to such predetermined pressure for bypassing the unit in augmenting the braking pressure.

5. A hydraulic brake system for motor vehicles, comprising a brake line establishing communication between a manually actuated pressure producing device and a brake motor, a control unit interposed in the line and responding to a predetermined initial brake setting pressure therein to interrupt the communication, said unit having a pressure actuated valve seating in the direction of flow from the device, a yieldable seat for the valve yieldable away from the latter and in such direction of flow, and power means including a normally closed valve responsive to such predetermined pressure as produced by said device for opening a unit-bypassing communication to the motor to increase the braking pressure above that manually applied.

6. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a pump pressure control unit interposed in the first branch passage and responsive to the pump generated pressure in the brake line, and pulsation absorbing means arranged to preclude the transmission of the pump pulsation to the device.

7. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a valve in the first branch passage responsive to the manual device above such predetermined pressure for opening said first branch passage to the pump, and means automatically actuating the pump in response to such higher pressure to supplement the manual braking pressure.

8. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a valve in the first branch passage responsive to the manual device above such predetermined pressure for opening said first branch passage to the pump, means automatically actuating the pump in response to such higher pressure to supplement the manual braking pressure, and means responsive to a pump generated pressure in excess to a predetermined degree for closing the valve and thereby render the pump inoperative.

9. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, and means responsive to the pressure in the second branch passage for regulating the spring urge upon said valve in proportion to an increase in fluid pressure above such predetermined pressure.

10. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, said pump being normally inactive and responding to the pressure admitted by the opened valve for generating a higher braking pressure, and means operable to limit the degree of higher pressure.

11. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, said pump being normally inactive and responding to the pressure admitted by the opened valve for generating a higher braking pressure, and capacity increasing resilient means associated with the second branch passage and acting to dampen the pump pulsations.

12. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, said pump being normally inactive and responding to the pressure admitted by the opened valve for generating a higher braking pressure, a chamber in communication with the second branch passage and resilient means acted upon the chamber pressure to cushion the pulsations in the system.

13. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, said pump being normally inactive and responding to the pressure admitted by the opened valve for generating a higher braking pressure, a chamber in communication with the second branch passage and resilient means acted upon the chamber pressure and connected to the valve spring to increase its spring urge as the chamber pressure increases.

14. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, said pump being normally inactive and responding to the pressure admitted by the opened valve for generating a higher braking pressure, a chamber in communication with the second branch passage, and resilient means acted on by the chamber pressure and connected to the valve spring to increase its spring urge as the chamber pressure increases, said resilient means having a part operable at an abnormally high pressure to positively hold the valve closed against further response to said device.

15. A hydraulic brake system for motor vehicles, comprising a brake motor, a manual pressure supply, a brake line establishing communication between the two, a control unit interposed in the line for determining the initial braking pressure and responding to a predetermined pressure therein to interrupt the communication, said unit having a pressure actuated valve seating in the direction of flow from the device and responding to the pressure of the supply, a seat for the valve yielding from the latter to permit a continuance of the fluid flow until such predetermined pressure is built up in the brake motor, and power means responsive to a predetermined differential between the motor pressure and the manual pressure for augmenting the braking pressure.

16. A hydraulic brake system for motor vehicles, comprising a manual pressure supply, a brake motor, a brake line establishing communication between the two, a control unit interposed in the line and responding to a predetermined pressure therein to interrupt the communication, a pump intaking fluid through a branch passage to the line between the device and the unit and discharging it through a second branch passage to the line between the unit and the motor, a valve in the first branch passage responsive to the manual device above such predetermined pressure for opening said first branch passage to the pump, means automatically actuating the pump in response to such higher pressure to supplement the manual braking pressure, and an expansible chamber communicating with the first branch passage for receiving intermittently the excess fluid displacement between pump strokes.

17. A hydraulic brake system for motor vehicles, comprising a brake line establishing communication between a manually actuated pressure producing device and a brake motor, a control unit interposed in the line and responding to a predetermined pressure therein to interrupt the communication, a pulsation producing pump having an inlet connected by a branch passage to the line between the device and the unit and an outlet connected by a second branch passage to the line between the unit and the motor, a spring seated valve normally closing the first branch passage and opening in response substantially to such predetermined pressure to supply the pump with fluid as furnished by said device, means responsive to the pressure in the second branch passage for regulating the spring urge upon said valve in proportion to an increase in fluid pressure above such predetermined pressure, and means operable to absorb the pulsations in the first branch passages against transmission to the device.

18. A hydraulic brake comprising a master cylinder with a pedal for actuating the same, a brake motor, a pair of parallel conduits connecting the master cylinder to the motor, means arranged in one conduit and responsive to a predetermined foot pressure for closing the same, means arranged in the companion conduit normally closing the same and responsive to substantially such predetermined pressure for opening the same, power means interposed in the companion conduit between said closing means and the motor and responsive to the fluid pressure admitted by the opening of said closing means for producing a higher braking pressure, and means responsive to such higher pressure for yieldably resisting the opening of said closing means.

19. A hydraulic brake comprising a master cylinder with a pedal for actuating the same, a brake motor, a pair of parallel conduits connecting the master cylinder to the motor, means arranged in one conduit and responsive to a predetermined foot pressure for closing the same, a valve arranged in said companion conduit and normally closing the same, a power driven pump interposed between the valve and the brake motor in such companion conduit and responsive to the master cylinder pressure above such predetermined pressure, and means responsive to the braking pressure in the companion conduit for closing said valve against excessive pressure.

20. A hydraulic brake comprising a master cylinder with a pedal for actuating the same, a brake motor, a pair of parallel conduits connecting the master cylinder to the motor, means arranged in one conduit and responsive to a predetermined foot pressure for closing the same, a valve arranged in said companion conduit and normally closing the same, a power driven pump interposed between the valve and the brake motor in such companion conduit and responsive to the master cylinder pressure above such predetermined pressure, said pump having an intaking stroke and a discharge stroke, pulsation dampening means interposed in the companion conduit between the valve and the pump, and means responsive to the pump pressure at the discharge side thereof for yieldably urging the valve to its closed position.

CARROLL B. VICKERS.

REFERENCES CITED

The following references are of record in the file of this patent:

UNITED STATES PATENTS

| Number | Name | Date |
|---|---|---|
| 2,270,586 | Jahant | Jan. 20, 1942 |
| 2,361,419 | Schnell | Oct. 31, 1944 |
| 2,396,897 | Stelzer | Mar. 19, 1946 |